Figure 1:
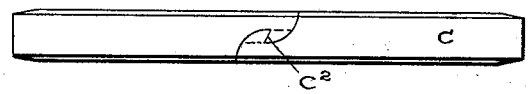

No. 734,317. PATENTED JULY 21, 1903.
H. GEISENHÖNER.
OIL CARRYING RING FOR JOURNAL BEARINGS.
APPLICATION FILED JUNE 14, 1901.
NO MODEL.

Witnesses
Erving R. Gurney
Benjamin B. Hull

Inventor
Henry Geisenhöner
by Albert G. Davis
Atty.

No. 734,317. Patented July 21, 1903.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

OIL-CARRYING RING FOR JOURNAL-BEARINGS.

SPECIFICATION forming part of Letters Patent No. 734,317, dated July 21, 1903.

Application filed June 14, 1901. Serial No. 64,523. (No model.)

*To all whom it may concern:*

Be it known that I, HENRY GEISENHÖNER, a citizen of the United States, residing at Schenectady, in the county of Schenectady, State of New York, have invented certain new and useful Improvements in Oil-Carrying Rings for Journal-Bearings, of which the following is a specification.

This invention relates to lubricating devices for journal-bearings, and it is especially useful in dynamo-electric machines, though applicable to many kinds of machines, to shaft-bearings, car-axles, and the like. Heretofore it has been proposed to lubricate such bearings by means of an endless band, such as a ring, hung on the journal and depending into a body of oil or other lubricant in an oil-cellar under the journal. The rotation of the shaft imparts a slow rotation to the ring, whose surface by adhesion carries a constant supply of oil up to the journal. The simplicity and efficiency of this mechanism has brought it into widespread use in one form or another, especially in dynamo-electric machines; but in the practical application of this device there are certain serious drawbacks. If solid rings are used, as is often the case, they must be slipped over the end of the shaft before it is lowered into its bearings. If the rings are made in halves with scarfed joints secured together by small screws, as is usually the case with large machines, the two segments of the ring must be put together around the shaft and the screws inserted after the shaft is in place. In either case it is an awkward and troublesome job. The screws are necessarily small, and being generally in an oily condition they easily slip out of the fingers of the workman and fall into the oil-cellar. If the man is careless and uses a screw that is too long, so that its end projects, or if he runs short of screws when he is in a hurry and drives a plug of wood into the screw-holes, or even twists a piece of wire through them to avoid the trouble of getting more screws, the projecting portions will catch in the bearing-blocks when the machine is started, the ring ceases to rotate, and the bearing soon gets hot. When the rings are to be removed, the shaft must be lifted out of the bearing to permit the solid rings to be slipped off, while the segmental rings must have their screws taken out at each joint, so that the screws and sometimes pieces of the ring itself fall into the oil-cellar or get lost.

My invention aims to obviate all these difficulties and annoyances by providing a segmental ring with non-removable fastening devices preferably integral with the ring, so that no screw-driver or other tool is needed to put it together or take it apart, and of such a nature that the ring retains its uniform external shape and its uniform weight per unit of length, so as to rotate at a uniform speed and effect a uniform lubrication of the journal. I accomplish this by the invention hereinafter set forth, which consists of an oil-carrying ring made in two or more parts or segments hinged together at one end and held closed in annular form by interlocking hooks on their other ends, the exterior shape and the cross-section of the ring being retained uniform and the weight being practically the same for any given unit of length. There are no external projections to foul up or catch in the bearing and no movable or removable fastening devices to work loose or get out of order or be mislaid when the ring is taken out. When closed, the ring is to all intents, purposes, and appearance a solid ring like those heretofore in use. This segmental ring can be quickly and easily applied to a shaft after it has been mounted in its bearings by simply opening the ring, passing it around the shaft, and closing it again. Such a ring can be placed upon a shaft at any point, rendering it especially useful in the case of long lines of shafting or large and heavy machine-shafts.

Figure 2:
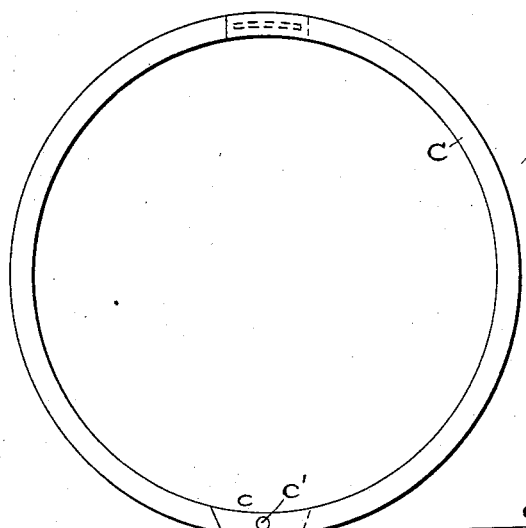
Figure 4:
Figure 5:
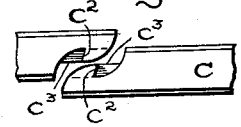
Figure 3:
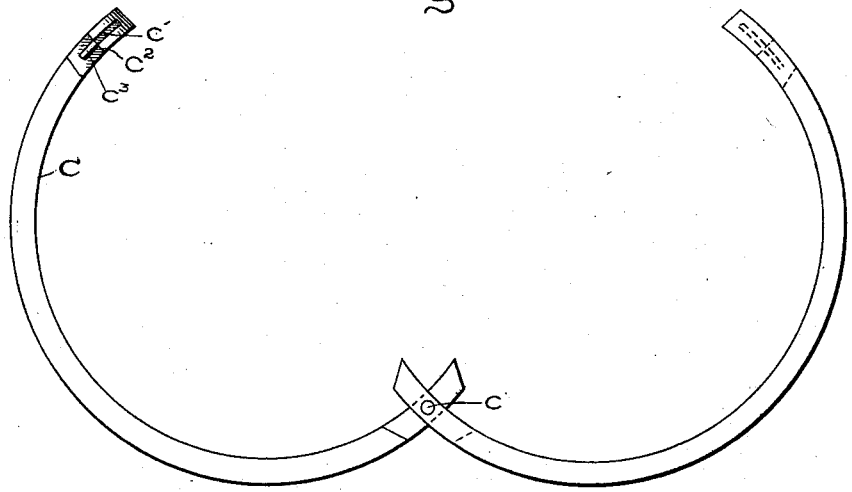

In the accompanying drawings, Figure 1 is an edge view of the ring, showing the interlocking hooks. Fig. 2 is a side view of the ring closed. Fig. 3 is a similar view showing the ring opened. Fig. 4 is an edge view of the hinge-joint, and Fig. 5 is an edge view of the interlocking hooks in the act of engaging with each other.

The rings may be of any desired cross-section, but they have, preferably, cylindrical inner and outer surfaces, the side edges being beveled, as shown, so that the outer surface is the narrower. This shape insures ample oiling-surface and the free and unobstructed movement of the ring through the grooves. Each ring is made in segments, preferably halves, hinged together. One segment may be the longer, if desired, yet not so long but that when the ring is opened the space between its ends will be enough to admit the shaft. The hinge is preferably a simple scarf-joint $c$ with a pintle $c'$ put transversely through it, as shown in Fig. 4. Each free end of the two segments is provided with a hook, preferably integral and both similar in shape and adapted to interlock and form a smooth strong joint when closed. I prefer the hook shown in Figs. 1, 3, and 5, which is substantially on the lines of an ogee curve, with an offset $c^2$ at the middle of the curve, forming the hook. From the offset to the inner end of the curve runs a median rib $c^3$, while the head of each hook has a median groove $c^4$ to receive the rib on the other hook, thus locking each hook against radial displacement, the hooks being preferably arranged to couple on a plane lying axially of the ring. The resilience of the material of which the ring is made is sufficient to permit the two segments to yield laterally and let the hooks slip past each other, as shown in Fig. 5, until they arrive at the position shown in Fig. 1, where the resilience of the ring causes them to engage and retains them closed. Such a ring as this can be applied to a shaft by simply disengaging the hooks, opening the ring, slipping it transversely onto the shaft, and snapping the hooks together again. The operation of removing it when necessary is equally simple. When made in halves, the two segments can be cast from the same pattern and will fit together without requiring any hand-work except driving in the pintle of the hinge.

What I claim as new, and desire to secure by Letters Patent of the United States, is—

1. An oil-carrying ring for journal-bearings, composed of segments provided with interlocking hooks, having grooves and ribs to prevent displacement.

2. An oil-carrying ring for journal-bearings, composed of segments provided with interlocking hooks, each having a head containing a groove, and a rib behind said groove.

3. An oil-carrying ring for journal-bearings, composed of segments provided with interlocking hooks, each formed on an ogee curve with an offset in the middle, a rib behind said offset, and a groove in the head in line with said rib.

In witness whereof I have hereunto set my hand this 12th day of June, 1901.

HENRY GEISENHÖNER.

Witnesses:
BENJAMIN B. HULL,
EDWARD WILLIAMS, Sr.